United States Patent [19]
Kuhn et al.

[11] Patent Number: 5,103,857
[45] Date of Patent: Apr. 14, 1992

[54] SELF CLOSING VALVE ASSEMBLY

[75] Inventors: Weldon R. Kuhn, Sheboygan Falls; Kirk T. Nick, Sheboygan both of Wis.

[73] Assignee: Kohler Co., Kohler, Wis.

[21] Appl. No.: 423,171

[22] Filed: Oct. 18, 1989

[51] Int. Cl.$^5$ .................. F16K 31/524; F16K 43/00
[52] U.S. Cl. ........................ 137/315; 74/57; 137/454.5; 251/255; 251/256; 251/263; 251/288
[58] Field of Search ............. 137/454.5, 454.6, 315; 251/251, 252, 253, 254, 255, 256, 284, 288, 263; 74/55, 56, 57, 567

[56] References Cited

U.S. PATENT DOCUMENTS

| | | | |
|---|---|---|---|
| 387,162 | 7/1888 | Haynes | 251/256 |
| 852,155 | 4/1907 | Bashlin | 251/256 |
| 1,156,010 | 10/1915 | Kenney | 251/256 |
| 1,562,979 | 11/1925 | Muend | 137/454.5 |
| 1,602,118 | 10/1926 | Mortimer | 137/454.5 |
| 2,606,450 | 8/1952 | Bolling | 251/255 |
| 2,646,248 | 7/1953 | Cornelius | 251/263 |
| 2,934,091 | 4/1960 | Chapou | 137/454.5 |
| 3,789,870 | 2/1974 | Keller, III | 137/454.5 |
| 4,303,222 | 12/1981 | Campbell | 251/252 |
| 4,343,456 | 8/1982 | Zitzloff | 251/263 |

Primary Examiner—George L. Walton
Attorney, Agent, or Firm—Quarles & Brady

[57] ABSTRACT

A self closing valve assembly is disclosed. A retainer member provides support for a spring for biasing the valve actuating cam members as well as providing a valve seat. The component parts are housed in a cartridge for easy placement in a faucet as well as for conversion of other faucets to the self closing type. Opening of the valve is accomplished by only a rotary motion of the valve stem without an axial handle motion.

9 Claims, 3 Drawing Sheets

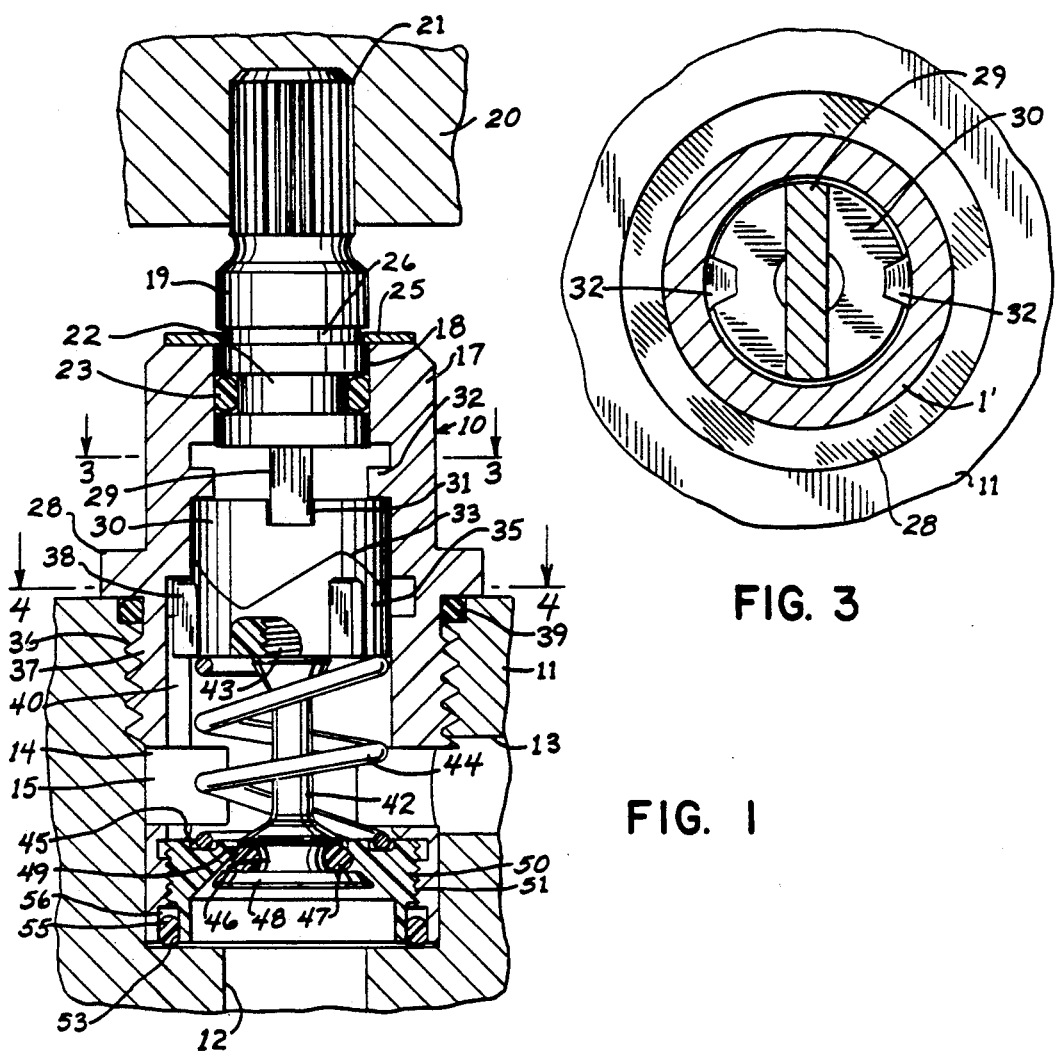
FIG. 1
FIG. 3
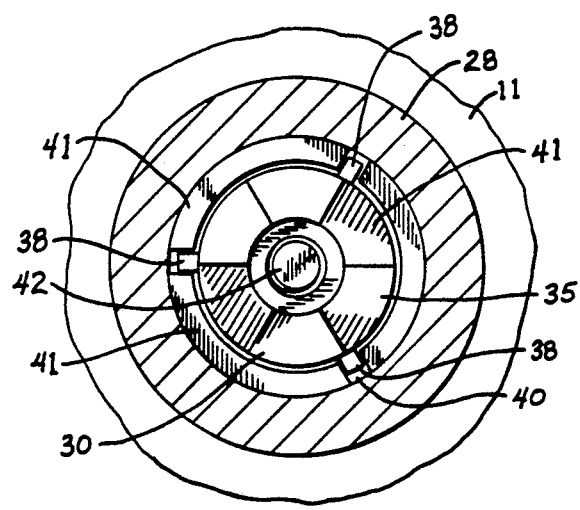
FIG. 4

SELF CLOSING VALVE ASSEMBLY

BACKGROUND OF THE INVENTION

1. Field Of The Invention

This invention relates primarily to faucet valves which are of the automatic, quick closing type, as distinguished from delayed, closing type. More particularly, it relates to a valve of this type where the valve can be part of a self contained cartridge unit.

2. Description Of The Art

There are currently available a number of quick acting, self closing faucet valves. Valves of this type often require the assembly of numerous and/or expensive component parts. Still other valves of this type require the handle to have an unnatural axial motion which is not as desirable by certain consumers Still other such valves require unique, non-standard housings and thus cannot be used for replacement of the standard valves without replacing the housing as well. Thus it can be seen that a need has existed for an improved valve of this type.

SUMMARY OF THE INVENTION

In one aspect, the invention provides a self closing type valve for use in a housing or the like, the housing having an inlet in its bottom and an outlet. The valve has a valve body with an axial bore and an open lower end for fluid communication with the inlet in the housing.

A rotatable cam member and an axially movable cam member are both positioned in the valve body with both having cam surfaces for engagement with each other. A rotatable spindle is operatively connected to the rotatable cam member and extends out the upper part of the valve body. A shaft is operatively connected at its upper end to the axially movable cam and has a valve sealing member at its lower end.

A retainer member is secured to the open lower end of the valve body with the retainer member defining a valve seat for closure by the valve sealing member. A biasing member is disposed between the retainer and the axially movable cam member to bias the axially movable cam member against the rotatable cam member. Rotation of the spindle rotates the rotatable cam member, which in turn moves the axially movable cam member axially and the valve sealing member away from the valve seat without requiring axial movement of the spindle.

In another preferred form the retainer member is in the from of a cup with a central through bore and peripheral threads and the retainer is securable by a threaded engagement to the valve body.

In still another preferred form, the self closing valve is contained in a cartridge unit.

In another aspect, there is an internal guide means operatively associated with the cam members.

In still another preferred form, the valve sealing member is positioned on the fluid inlet pressure side of the valve body.

It will be appreciated that the retainer member for the biasing means offers the advantage of ease of assembly of the component parts into a valve body. Not only does the biasing means retainer afford this advantage, but also provides for a valve seat. A minimum number of component parts is required in a self closing type faucet which is readily supplied as a cartridge unit in the valve body.

The objects of the invention therefore include a. providing a valve of the above kind wherein a retainer member functions to spring bias the cam members as well as serves as a valve seat;

b. providing a valve of the above kind which obviates axial motion of the handle knob;

c. providing a valve of the above kind which can be preassembled into a valve body as a cartridge unit;

d providing a valve of the above kind which fits into standard housings; and e. providing a valve of the above kind which employs a minimum number of parts and thus is inexpensive to produce.

These and still other objects and advantages of the invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 1 is a view, partially in cross section, showing a valve assembly constituting a preferred embodiment of the invention, the assembly being mounted in a faucet housing and in a "valve closed" position;

FIG. 3 is a sectional view taken along line 3—3 of FIG. 1;

FIG. 4 is a sectional view taken along line 4—4 of FIG. 1;

THE PREFERRED EMBODIMENT

Figure 2:
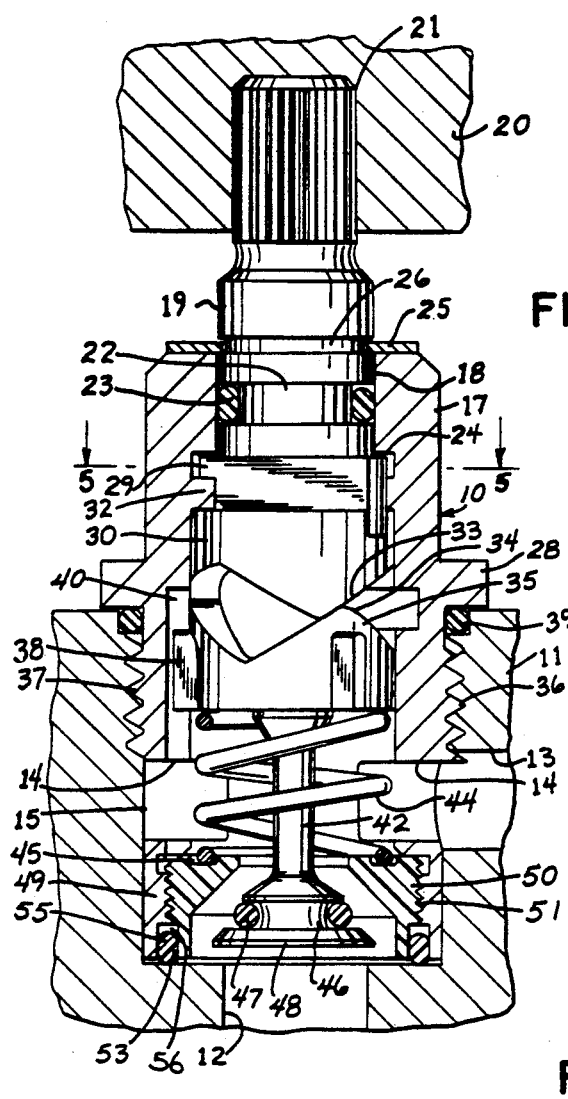
FIG. 2 is a view similar to FIG. 1 showing the valve in the open position.
Figure 5:
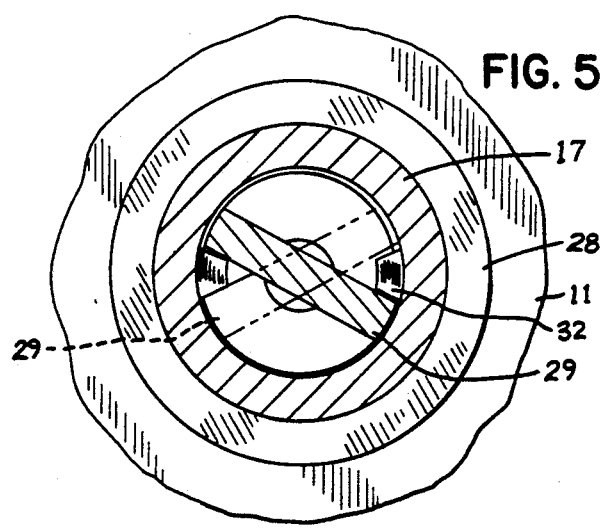
FIG. 5 is a sectional view taken along line 5—5 of FIG. 2.

Referring to FIGS. 1 and 2, the valve assembly generally 10 is shown in conjunction with a threaded faucet housing 11. The housing 11 has the usual water inlet 12, side outlet 13 and a valve cartridge receiving cavity 15. The direction arrows in FIG. 2 illustrate the pathway of water through the cartridge valve from the inlet 12, up to the valve to the side openings 14. The water will be directed out of the housing 11 through the outlet 13.

A brass valve cartridge body 17 has a bore 18 for receiving a brass valve stem 19 or spindle. The usual handle knob 20 is placed on a splined upper end 21. A peripheral groove 22 in the stem 19 receives an O-ring type seal 23. The stem 19 is securely held in the valve body 17 by means of a retaining ring 25 held in the groove 26.

As best seen in FIG. 2, the bottom of the stem will not pass entirely up through bore 18 due to the abutment of flange portion 29 engaging the shoulder 24. This flange portion 29 is formed at its lower end with a bar to provide a driving member for engagement with a rotatable top cam 30. This engagement is afforded by the groove 31. The flange portion 29 in conjunction with the valve body internal stops 32 also limits rotation of the valve stem 19.

The rotatable cam 30 has a lower cam surface 33 for engagement with the top cam surface 34 of the slideable cam 35. This is best seen in FIG. 2. The slideable cam 35 is held in a nonrotatable but slideable manner in the skirt portion 37 of the valve body 17 by cam wings 38 for slideable engagement with the valve body internal guide slots 40. The valve body 17 is threaded to the faucet housing 11 by threads 36. A seal 39 is positioned between the flange portion 28 of the valve body 17 and the top of the faucet housing 11.

As best seen in FIG. 1, a shaft 42 is threadably secured to the slideable bottom cam 35 by the complementary threads 43. At the opposite end, the shaft has a groove 46 provided in part by the flange 48 for receiving a valve seal 47. A retainer cup/valve seat 50 is threadably secured in the end of the skirt portion 37 by the complementary threads 51 and provides a valve seat surface 49. The retainer member has a top groove 45 for also positioning a spring 44 which biases the slideable cam 35 against the rotatable cam 30 for retention in the valve body 17. The retainer member 50 also has an undercut 53 for placement of a seal 55 between the retainer member 50 and an undercut 56 in the end of the skirt portion 37.

As best seen in FIG. 3, there are two oppositely positioned stops 32 which extend from inside the valve body 17 for contact with the flange portion 29 of the valve stem 19. Due to the connection of the valve stem 19 with the rotatable cam 30 this also limits the rotation of the rotatable cam 30. The stops 32 are positioned so as to limit rotation of the valve stem to approximately 55 degrees (to prevent overriding of the cams).

As best seen in FIG. 4, rotation of the slideable cam 35 is prevented by the three arcuate segments 41 that are spaced apart to provide the vertical guides 40 of the wings 38 extending from the slideable cam 35.

Figure 7:
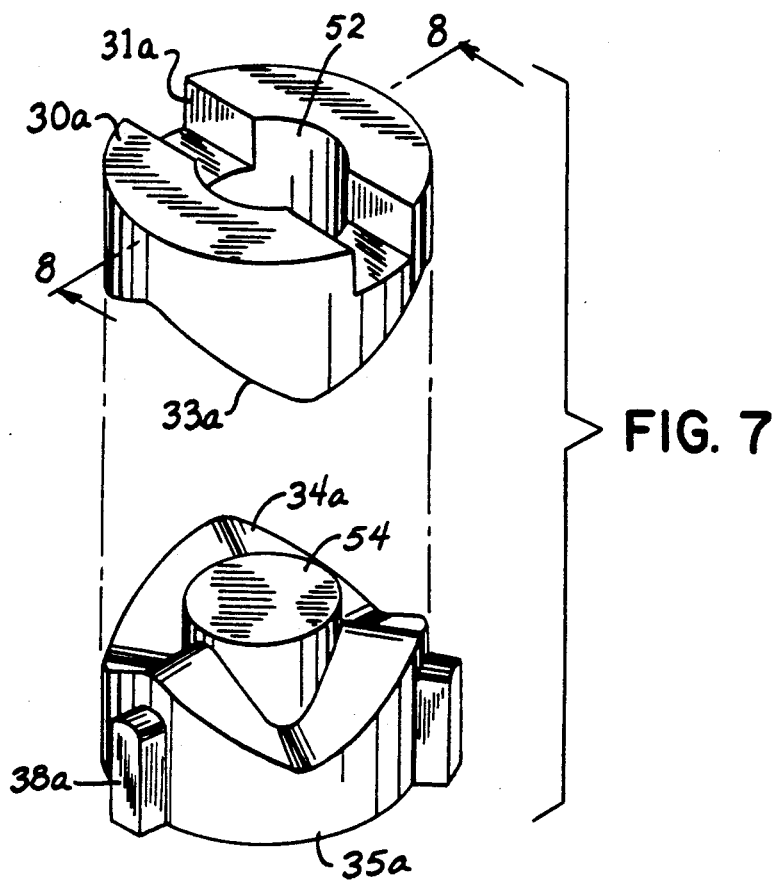
FIG. 7 is an exploded perspective view of an alternative embodiment of camming parts employed in the valve assembly.
Figure 8:
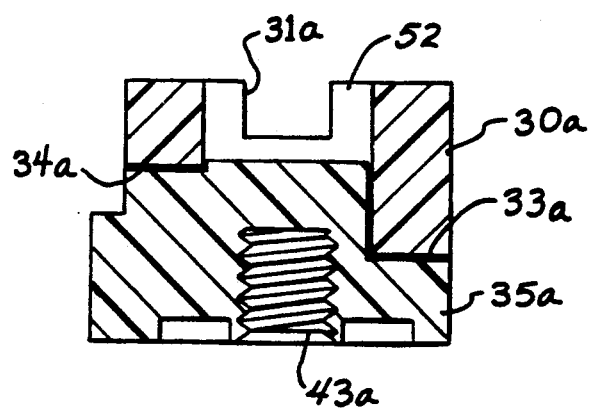
FIG. 8 is a sectional view taken along line 8—8 of FIG. 7.

Referring to FIG. 7, there is shown an alternative embodiment of the rotatable cam 30 and the slideable cam 35. Similar components are designated with the same numbers except followed by the letter "a". Rotatable cam 30a and slideable cam 35a differ from cams 30 and 35 in that slideable cam 35a has an extending guide post 54 for reception in the guide aperture 52 of rotatable cam 30a. This feature assures aligned contact between the cams 30a and 38a at all times during their relative movement and thus proper orientation.

Referring to FIG. 1, the self closing valve assembly 10 is shown in the closed position with the seal 47 engaging the valve seat portion 49 of the retainer member 50 Note that closing of the valve is in the direction of the inlet water pressure which would be provided from the water inlet 12. Thus, water pressure assists the seal.

When it is desired to open the valve, a turning force is imparted on the handle 20. This rotary motion is transmitted to the rotatable cam 30. As its camming surface 33 moves over the camming surface 34 of the slideable cam 35, the slideable cam 35 is driven downwardly. This is best seen in FIG. 2 This separation of the cam members 30 and 35 also causes a downward movement of the shaft 42 and the consequent movement of the valve seal 47 away from the valve seat portion 49. This opens the valve and allows water to flow into the valve body 17 and outwardly through the water outlet 13.

It should be appreciated that it is only when a rotary force is imparted to the handle 20 that the cam members 30 and 35 remain separated. Upon release of this force on the handle 20, the force of the biasing spring 44 will drive the slideable cam 35 upwardly toward the rotatable cam 30 so that the camming surfaces again mate as shown in FIG. 1. This automatically returns the valve seal 47 to the closed position as shown in FIG. 1.

One of the important features of this invention is that retainer member 50 serves the dual function of retaining the spring 44 for biasing the slideable cam 35 against the movable cam 33 while at the same time providing a replaceable valve seat portion 49 for engagement with the sealing ring 47.

An additional feature is the fact that only rotation of the handle 20 to open the valve in the previously described manner is required and that axial motion is not required. This is important in a self closing valve where one hand is being utilized to open the valve while the other hand is being washed.

Figure 6:
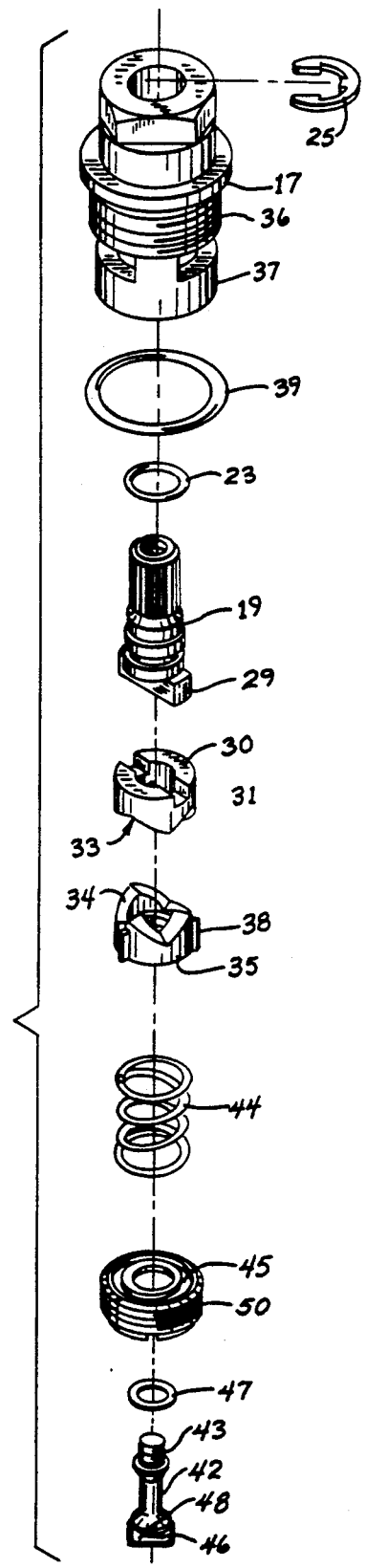
FIG. 6 is an exploded perspective view of the valve assembly parts shown in FIGS. 1 and 2.

Yet another important feature is the fact that all of the component parts of the valve as illustrated in FIG. 6 are contained in a valve body 17 which in effect serves as a cartridge. This valve body or cartridge is designed to have the same external dimensions as many standard ceramic valve cartridges This allows the self closing valve cartridge to fit faucets which accepts standard ceramic valve cartridges. It also can accept most standard faucet handle packages.

Thus, our invention provides an improved self closing valve. While the preferred embodiment has been described above, it should be readily apparent to those skilled in the art from this disclosure that a number of modifications and changes may be made without departing from the spirit and scope of the invention For example, while a water faucet has been shown, the valve can be used with other types of fluid valves. Also, the specific materials mentioned are not the only materials which can be used. All such and other modifications within the spirit of the invention are meant to be within the scope of the invention.

We claim:

1. A self closing replacement cartridge type valve for use in a housing or the like, the housing having an inlet in its bottom and an outlet, the valve comprising:

a cartridge valve body having an axial bore with an open lower end for fluid communication with the inlet in the housing;

a rotatable cam member and an axially movable cam member, both being positioned in the valve body and both having cam surfaces for engagement with each other;

a rotatable spindle operatively connected to said rotatable cam member and extending out an upper part of said valve body;

a shaft operatively connected at its upper end to said axially movable cam and having a valve sealing member at its lower end;

a retainer member secured to said open lower end of said valve body, said retainer member defining a valve seat for closure for said valve sealing member;

a biasing member disposed on said retainer and said axially movable cam member to bias said axially movable cam member against said rotatable cam member, said valve body, said cam members, said rotatable spindle, said shaft, said retainer member, and said biasing member being removed from said housing as a single unit, and when said biasing member is to be replaced only said retainer member needs to be removed from said open lower end of said valve body while leaving said cam members, said rotatable spindle and said shaft within said valve body, the valve being constructed and arranged so that rotation of said spindle rotates said rotatable cam member, which in turn moves said axially movable cam member axially and said valve sealing member away from said valve seat without requiring axial movement of the spindle.

2. The valve of claim 1, wherein said retainer member is in the form of a cup with a central through bore and peripheral threads and the retainer is securable by a threaded engagement to said valve body.

3. The valve of claim 1, wherein said biasing means is a spring which surrounds a portion of the shaft.

4. The valve of claim 1, further including internal guide means operatively associated with said cam members.

5. The valve of claim 1, wherein said valve sealing member is defined by a neck on the shaft for retention of an O-ring sealing member 6. The valve of claim 1, further including a driver member for contact with said rotatable cam member and stops inside said valve body for rotative contact with said driver member.

7. The valve of claim 1, further including vertically extending cam guides inside said valve body to prevent rotation of said axially movable cam member yet provide axial movement.

8. The valve of claim 1, wherein said self closing valve is contained in a cartridge unit.

9. The valve of claim 1, wherein said valve body and said rotatable cam member having stop members to prevent upward movement of said rotatable cam member said stop members also limiting rotation of said rotatable spindle.

* * * * *